United States Patent
Feichtner

[11] 3,928,814
[45] Dec. 23, 1975

[54] COLLINEAR ACOUSTO-OPTICAL TUNABLE FILTER AND ACOUSTO-OPTICALLY TUNABLE LASER

[75] Inventor: John D. Feichtner, Murrysville, Pa.

[73] Assignee: Westinghouse Electric Corporation, Pittsburgh, Pa.

[22] Filed: Feb. 25, 1974

[21] Appl. No.: 445,526

[52] U.S. Cl. ............................ 331/94.5 M; 350/149
[51] Int. Cl.² ............................................. H01S 3/10
[58] Field of Search ........... 331/94.5; 350/160, 161, 350/149

[56] References Cited
UNITED STATES PATENTS
3,828,276  8/1974  Cohen............................ 331/94.5 Q

OTHER PUBLICATIONS

Taylor et al., *Electronic Tuning of a Dye Laser Using the Acousto–Optic Filter*, Appl. Phys. Lett., Vol. 19, No. 8, (Oct. 15, 1971), pp. 269–271.

Primary Examiner—William L. Sikes
Attorney, Agent, or Firm—R. D. Fuerle

[57] ABSTRACT

A collinear, acousto-optical, tunable filter is described. A well-collimated, polarized beam of light enters a crystal of $Tl_3AsSe_3$. A sound wave generated in the crystal collinear to the light rotates the plane of polarization of the light. A method of analyzing a light spectrum is also disclosed.

An acousto-optically tunable laser employing an acousto-optical filter between the mirrors of a laser is also described.

6 Claims, 4 Drawing Figures

COLLINEAR ACOUSTO-OPTICAL TUNABLE FILTER AND ACOUSTO-OPTICALLY TUNABLE LASER

CROSS REFERENCE TO RELATED APPLICATIONS

This application is related to U.S. Pat. No. 3,746,866, which describes other acousto-optical applications of $Tl_3AsSe_3$. Also, see application Ser. No. 242,986, filed Apr. 11, 1972 by George Warren Roland, John David Feichtner, and Milton Gottlieb, entitled "$Tl_3AsS_4$ Crystals and Acousto-Optical Systems," now U.S. Pat. No. 3,799,659.

BACKGROUND OF THE INVENTION

When a sound wave and a polarized light wave move collinearly in certain anisotropic crystals, the plane of polarization of the light wave is rotated, provided that the equation $|K_o| - |K_e| = |K_a|$ is satisfied, where $K_o$, $K_e$, and $K_a$ are the momentum vectors for the ordinary, extraordinary and acoustic waves, respectively.

Acousto-optical filters, which make use of this phenomenon, have been made from fused silica, lithium niobate ($LiNbO_3$), and calcium molybdate ($CaMoO_4$). The fused silica device is described by J. A. Kusters, D. A. Wilson, and D. L. Hammond in a paper entitled "Selection Rules for Optimum Crystallographic Orientation in Acoustically Tuned Optical Filters," submitted to Journal of the Optical Society, 1973. The lithium niobate filter is described by S. E. Harris and R. W. Wallace in an article entitled "Acousto-Optic Tunable Filter," Journal of the Optical Society of America, Vol. 59, No. 6, pages 744 to 747, (June 1969). Another version of the lithium niobate filter is described in an article entitled "Electronically Tunable Acousto-Optic Filter" by S. E. Harris, S. T. K. Nieh, and D. K. Wilson, Appplied Physics Letters, Vol. 15, No. 10, pages 325 to 326, (Nov. 15, 1969). The calcium molybdate filter is described in "$CaMoO_4$ Electronically Tunable Optical Filter," by S. E. Harris, S. T. K. Nieh, and R. S. Feigelson, *Applied Physics Letters*, Vol, 17, No. 5, pages 223 to 225 (Sept. 1, 1970). Also, a tellurium dioxide filter, which is not collinear, is described by I. C. Chang, in "Non-Collinear Acousto-Optic Filters," IEEE Journal of Quantum Electronics, Vol. QE-9, No. 6, pages 660 to 661 (June 1973). Also see "Electronic Tuning of a Dye Laser Using the Acousto-Optic Filter," by D. J. Taylor, S. E. Harris, and A. T. K. Nieh in Applied Physics Letters, Vol. 19, No. 8, pages 269 to 271, Oct. 15, 1971.

The usefulness of a particular material in an acousto-optical filter depends upon several factors. The material should have a transparency range appropriate to the range of wavelengths which are of interest. The transmission range of the materials of which filters have been made extends to only about $4.5 \mu m$ in the infrared.

The material should also have a low acoustic drive power density requirement for 100% transmission at the peak of the transmission band so that it can be operated with as little power as possible. The acoustic drive power density $P_A/A$ (where $P_A$ is the acoustic power and $A$ is the area) required to achieve 100% optical transmission at the peak light wavelength of the filter response, $\lambda_o$ is given by:

$$\frac{P_A}{A} = \frac{\lambda o^2}{2L} \cdot \frac{\rho V^3}{n_o^3 n_e^3 p_{ij}^2}$$

where L is the length of the crystal, $\rho$ is the density, V is the acoustic velocity, $n_o$ and $n_e$ are the refractive indices of the ordinary and extraordinary rays, respectively, and $p_{ij}$ is the appropriate photoelastic coefficient. The power density can also be given by $$\frac{P_A}{A} \cong \frac{\lambda o^2}{2M_2 L^2}$$

where $M_2$ is the acousto-optic FIGURE of merit $$\frac{n^6 p_{ij}^2}{\rho V^3}$$

Thus, a high acousto-optic FIGURE of merit will result in a low drive power density requirement.

A low drive power density requirement for 100% transmission at the peak of the filter passband is very important at the longer infrared wavelengths because the drive power density requirement increases as the square of the optical wavelength of the filter. Thus, a filter operating at $3.5 \mu m$ requires 25 times the drive power density of a filter centered at $0.7 \mu m$, other parameters being equal ($(3.5/0.7)^2 = 25$).

SUMMARY OF THE INVENTION

I have found that an acousto-optical filter can be made from a crystal of $Tl_3AsSe_3$. This is somewhat surprising since $Tl_3AsSe_3$ is opaque to visible light and therefore the crystal cannot be easily aligned as were previous crystals used for acousto-optical filters.

I have also found that an acousto-optical, tunable filter using a crystal of $Tl_3AsSe_3$ has exceptionally desirable properties. In particular, the acoustic power density required to achieve 100% optical transmission at the peak of the filter response is relatively low due to its high acousto-optical FIGURE of merit (995 at $\lambda = 3.39 \mu m$). The filter can be used on light having a wavelength of about 1.23 to about $18 \mu m$ which is much farther in the infrared than previous filters and is a much larger range than that obtained with previous filters. That region of the infrared is particularly useful for laser applications as many materials lase in that range. The filter can also be used internal to a broad band laser to select a particular output frequency band.

DESCRIPTION OF THE INVENTION

Figure 1:
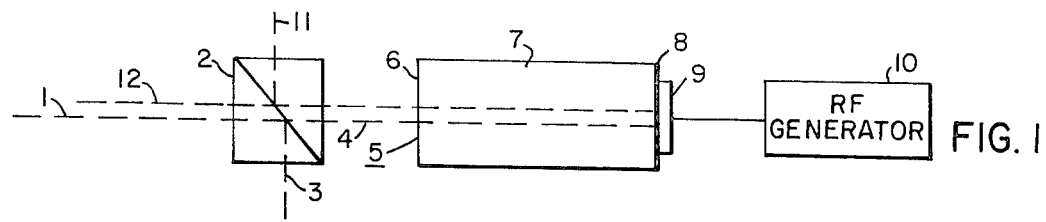
FIG. 1 is a diagram of a certain presently preferred embodiment of an acousto-optical filter according to this invention.

In a tunable filter a broad band (i.e., having more than one output frequency), polarized beam of light is passed through the crystal, preferably along one of the major axes for greatest efficiency. The a-axis is preferred because that axis has the lowest acoustic velocity, which means that low acoustic frequencies, which are easier to work at, can be used. Also, a longitudinal wave propagates as a pure mode along the a-axis and the a-axis makes maximum use of the $p_{41}$ photoelastic coefficient which rotates light waves.

The light beam should be "well-collimated" (i.e., have a beam divergence of less than about 10 milliradians) in order to be rotated. Light which is not well-collimated is not rotated and is therefore wasted. The light follows an optical path through the crystal, entering through one optical foace and leaving through the same or another optical face. Although the light must be within the transparency range of the crystal, light outside the range can be first upconverted or down-converted to fall within the range, using well-known optical frequency conversion techniques.

A longitudinal sound wave is generated in the crystal collinear with at least part of the optical path, moving in the same or the opposite direction as the light. The sound wave causes the plane of polarization of the light to rotate, provided that the phase matching condition $|K_o| - |K_e| = |K_a|$ is satisfied, where $K_o$, $K_e$ and $K_a$ are the vectors for the ordinary, extraordinary and acoustic waves, respectively. In terms of the light and sound wavelengths, the sound wavelength $\Lambda$ must equal the light wavelength, $\lambda$, divided by $|\Delta n|$, the absolute value of the birefringence of the crystal. The amount of rotation which occurs depends upon the acoustic power density in the crystal and the crystal length according to the formula $$\Gamma^2 = \frac{n_o^3 n_e^3 p_{41}^2}{2\lambda_o^2 \rho V^3} \frac{P_p}{A},$$

where $\Gamma$ is the rotation in radians of the plane of polarization per unit length and $L$ is the length of the crystal. $\Gamma^2$ is directly proportional to $P_p/A$, the applied acoustic power density, inversely proportional to the light wavelength squared, $\lambda_o^2$, and proportional to the combination of materials parameters $$\frac{n_o^3 n_e^3 p_{41}^2}{V^3},$$

where $n_o$ and $n_e$ are the ordinary and extraordinary refractive indices, $p_{41}$ the photoelectric coefficient, $\rho$ the density and $V$ the acoustic velocity.

The amount of light transmitted by the filter depends upon the acoustic power density according to the formula:

$$\frac{Px(L)}{Pz(O)} = \sin^2 \Gamma L,$$

where $Px(L)$ is the light power at the output end of the crystal and $Pz(O)$ is the light power at the input end of the crystal.

In actual operation, problems of aligning the acoustic wave and the light wave may occur since the material is opaque to visible light. Alignment may be made using a vislble light, such as a helium-neon laser, by turning the material until the visible light reflected from the optical face coincides with the impinging visible light.

The output of the tunable filter (i.e., the rotated light), which is a narrow band, can be passed into a broad band detector so that a light signal of unknown spectral composition can be analyzed. A sweep is made through acoustic frequencies between about 1 to about 500 MHz and the amount of rotated light is measured.

The tunable filter can also be operated inside the cavity of certain infrared lasers such as HF, CO, or $CO_2$ lasers, to tune the laser output to one of a number of discrete lines. Messages can also be sent with the filter by altering the sound wavelength according to an input electrical signal thereby altering the frequency of light passing through a polarizer (using a wide band light source). Other applications will no doubt suggest themselves to those skilled in this art.

FIG. 1

Referring to the drawings, in FIG. 1, a well collimated beam of light 1 strikes polarizer 2 which deflects one plane of polarization 3 and permits the other plane 4 to enter filter 5. The ray 4 strikes optical face 6 of a crystal 7 of $Tl_3AsSe_3$ and passes to reflecting surface 8, commonly gold or silver, which reflects the ray back to polarizer 2. A thin film transducer 9 powered by RF generator 10 generates a sound wave in the crystal 7 which rotates that portion of ray 4 which has a wavelength that satisfies the matching conditions. The portion of ray 4 which is rotated is deflected by polarizer 2 as ray 11, the remaining portion passing through the polarizer as ray 12. The configuration of FIG. 1 is preferred because it is the easiest to construct, align, and operate. Modifications of the configuration of FIG. 1 are also possible. For example, the face of the crystal to which the reflective surface is affixed could be a non-optical face covered with a transparent compound of the same refractive index to form an optical face.

FIG. 2

Figure 2:
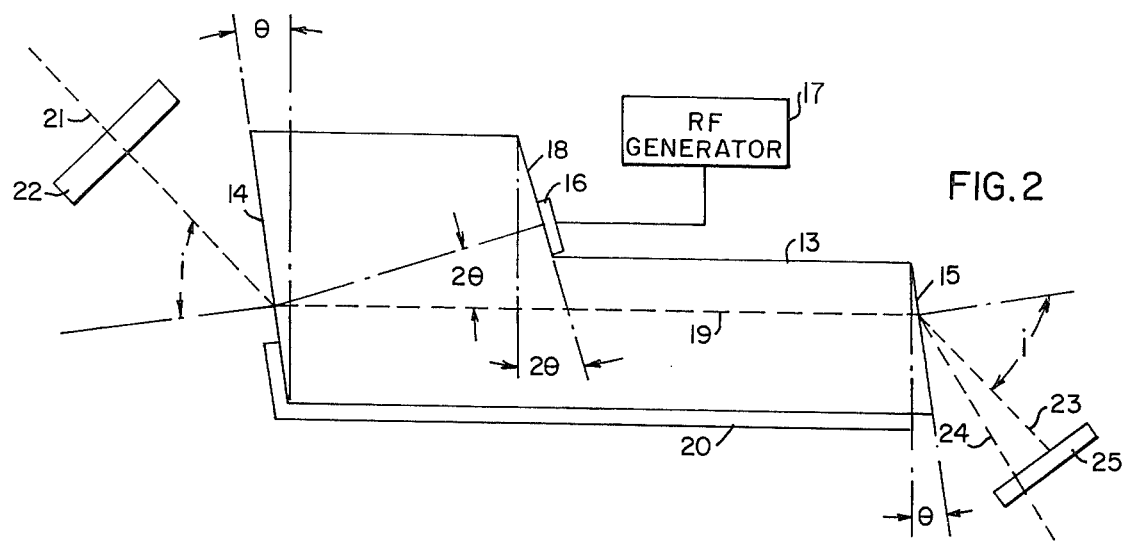
FIG. 2 is a diagram of another embodiment of an acousto-optical filter according to this invention.

FIG. 2 illustrates another type of collinear acousto-optical tunable filter. In FIG. 2, a crystal 13 of $Tl_3AsSe_3$ has two parallel optical faces 14 and 15 cut at an angle $$\theta = \sin^{-1}\left(\frac{1}{n}\right)$$

to its $a$ axis, where $n$ is the refractive index at the optical wavelength of interest and $\theta$ is about 5° to a maximum of about 21.6°.

An acoustic transducer 16, driven by RF generator 17 is mounted onto a third face 18, cut at an angle $2\theta$ to a normal optical path 19. The acoustic beam generated strikes face 14, is reflected from that face, and travels collinearly with the light beam on path 19 toward the face 15. At face 15 the acoustic beam is again reflected toward the bottom of the crystal, where it is absorbed by an acoustic terminator 20. Light ray 21 passes through polarizer 22 which removes one plane of polarization from the ray. The input light ray strikes optical face 14 at an angle $i = \sin^{-1}(n_e \sin \theta)$ which is selected so that the light ray will travel parallel to the acoustic waves in the crystal. The ray interacts with the acoustic waves, which results in the rotation of the plane of polarization. Unless the ray has been rotated a multiple of 180°, the ray leaving the crystal will have both an ordinary and an extraordinary component relative to the crystal, and these rays, 23 and 24, are refracted from the crystal at differing angles causing them to separate. The two rays strike analyzer 25 which is oriented so as to pass only that component of the rotated ray which is at 90° to the allowed direction of the polarizer.

FIG. 3

Figure 3:
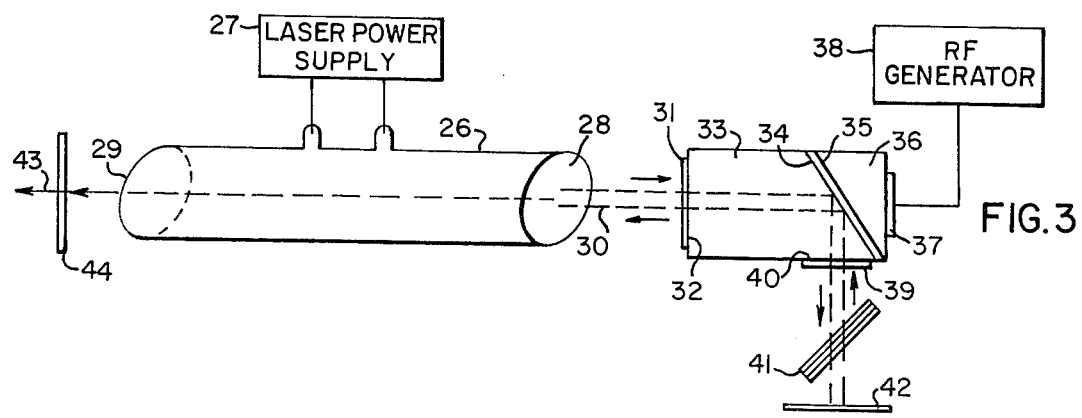
FIGS. 3 and 4 are diagrams of acousto-optically tunable lasers according to this invention.
Figure 4:
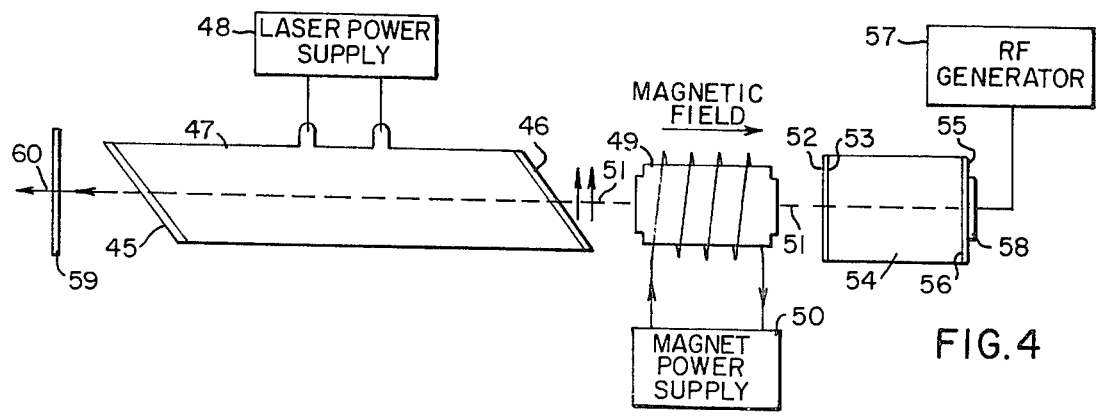

FIGS. 3 and 4 illustrate devices in which the acousto-optical filter can provide a continuous tuning of the output of a broad band laser such as a high pressure gas laser or a low pressure gas laser which would normally oscillate on several lines of slightly different wavelength.

In FIG. 3, a laser tube 26 powered by laser power supply 27 is equipped with polarizing Brewster angle windows 28 and 29. (A pile-of-plates or other polarizer can be used instead of or in addition to the Brewster angle windows). The laser radiation 30 may therefore be considered to be constrained to a polarization perpendicular to the page. Radiation 30 travels through anti-reflecting coating 31 on the first optical face 32 of the first section 33 of an acousto-optical crystal until it strikes 45° surface 34 which is coated with a reflecting metal film 35 such as gold, when it is reflected downward. Cemented (e.g., with indium) to the other side of metal film 35 is the second section 36 of the crystal. A transducer 37 is attached to the second crystal and is powered by RF generator 38. The radiation then passes through anti-reflecting coating 39 on the second optical face 40 of the crystal to analyzer 41. The analyzer is shown as a pile-of-plates although a dielectric film analyzer or other analyzer could also be used. When analyzer 41, is set to pass only radiation polarized parallel to the page, radiation is not reflected from mirror 42, and no feedback of radiation occurs.

However, when an acoustic wave is generated in the crystal collinearly with the radiation, the plane of polarization of the radiation is rotated provided that $$\lambda_o = \Delta n \wedge_o$$

where $\Delta n$ is the birefringence of the crystal and $\wedge_o$ is the acoustic wavelength. The amount of rotation, $\Gamma L$, is given by the formula:

$$\Gamma L = \left[ \frac{n_o^3 n_e^3 p_{41}^2 \pi^2 p_A}{2\lambda_o^2 \rho V^3 A} \right]^{1/2} L$$

If $\Gamma L = \pi/2$ the plane of polarization will be parallel to the page. It is now in an allowed polarization direction to be transmitted through analyzer 41. It strikes mirror 42, comes back through analyzer 41, enters the first section 33 of the crystal, is totally reflected at 45° interface 34, and travels to the left. As it travels to the left, the polarization is again rotated by 90° by the collinear acousto-optic interaction. The polarization is now once more perpendicular to the page, passes through Brewster angle windows 28 and 29 and laser action takes place in the normal way with output 43 through partially-reflecting mirror 44. Only radiation of the exact wavelength $\lambda_o = \Delta n \wedge_o$ will be rotated properly by the acousto-optic filter action to allow this feedback to take place. Thus, specific laser rotation vibration transitions in a gas laser can be selected by choosing the proper acoustic wavelength $\wedge_o$. The acoustic power will be transmitted across the bond cementing sections 33 and 36 together with only a slight loss in power due to absorption and scattering in the bond.

Note that mirror 42 can be made partially reflecting and mirror 44 totally reflecting so that laser output 43 is from mirror 42.

FIG. 4

In FIG. 4, a Faraday rotator is used in conjunction with the collinear acousto-optic filter to provide wavelength selection, modulation, and Q-switching of specific infrared gas laser rotation vibration transitions.

Brewster plates 45 and 46 on or near laser tube 47 powered by laser power supply 48 restrict the polarization to the plane of the paper. A magnetic field is applied to infrared Faraday rotator 49 by magnet power supply 50. The Faraday rotator can be made of cryogenically-cooled InSb, yttrium-indium garnet, EuS, EuO, etc. The magnetic field is adjusted to provide 45° rotation of the plane of polarization. The polarization plane of the radiation, 51 going to the right is thus rotated 45° after going through rotator 49.

It passes through anti-reflective coating 52 on one optical face 53 of acousto-optic crystal 54, is reflected off totally reflecting mirror 55 on the other optical face 56 of the crystal, and comes back through the Faraday rotator where it is rotated on additional 45° for a total of 90°, now being polarized perpendicular to the plane of the page. It thus is blocked by Brewster angle polarizer 46 and no feedback can occur. However, if RF generator 57 causes transducer 58 to generate an acoustic wave in crystal 54 of a frequency $\wedge_o = \lambda_o/\Delta_n$ with the acoustic power such that the total rotation down and back is $2\Gamma L = \pi/2$, the polarization will now have been rotated a total of 135° (45° in the Faraday rotator and 90° in the crystal). Now it comes back through the Faraday rotator and is rotated an additional 45°, for a total of 180°. Thus, the light can now pass through the Brewster angle polarizing windows on the laser tube. It experiences gain as it passes through the tube, and is partially reflected by mirror 59, and it contributes to laser output 60.

If the acousto-optical filter shown in FIG. 3 is used in FIG. 4, the positions of the partially-reflecting and totally reflecting mirrors can be interchanged.

THE CRYSTAL

A detailed description of the preparation and properties of a crystal of $Tl_3AsSe_3$ is given in U.S. Pat. No. 3,746,866 and in application Ser. No. 181,409 by George W. Roland and John D. Feitchtner titled "Non-Linear Optical Crystal and Devices," filed Sept. 17, 1971, now U.S. Pat. No. 3,792,287.

The following table gives the calculated values for resolution and required acoustic power density for 100% transmission, using a 2 cm crystal of $Tl_3AsSe_3$ and a value for $p_{41}$ obtained from measurement on $Tl_3AsSe_3$ at 3.39 μm.

| Optical Filter Ctr. Wavelength $\lambda_o$ | Birefringence $n_o - n_e$ | Acoustic Drive Frequency $f_a = \frac{V}{\lambda_o}(n_o - n_e)$ | Resolution or Optical Bandwidth, cm$^{-1}$ $\Delta y = \frac{1}{2(n_o - n_e)L}$ | Required Acoustic Power Density for $T\lambda = 100\%$ $\frac{P_A}{A} \quad \frac{\pi^2 \rho V^3 \lambda^2}{2n_o^3 n_e^3 p_{41}^2 L^2}$ |
|---|---|---|---|---|
| 2.1 μm | 0.189 | 194 MHz | 1.3 cm$^{-1}$ | 11 mW/mm$^2$ |
| 3.39 μm | 0.187 | 120 MHz | 1.3 cm$^{-1}$ | 29 mW/mm$^2$ |
| 4.2 μm | 0.186 | 97 MHz | 1.3 cm$^{-1}$ | 44 mW/mm$^2$ |

-continued

| Optical Filter Ctr. Wavelength | Birefringence | Acoustic Drive Frequency | Resolution or Optical Bandwidth, cm$^{-1}$ | Required Acoustic Power Density for $T\lambda = 100\%$ |
|---|---|---|---|---|
| $\lambda_o$ | $n_o - n_e$ | $f_a = \dfrac{V}{\lambda_o}(n_o - n_e)$ | $\Delta y = \dfrac{1}{2(n_o - n_e)L}$ | $\dfrac{P_A}{A} \quad \dfrac{\pi^2 \rho V^3 \lambda^2}{2 n_o^3 n_e^3 p_{41}^2 L^2}$ |
| 10.6 μm | 0.178 | 36 MHz | 1.4 cm$^{-1}$ | 270 mW/mm$^2$ |

Typical optical losses range from 0.02 to 0.35 cm$^{-1}$ for wavelengths between the absorption edges (at 10.6 μm the absorption loss is only 0.02 to 0.05 cm$^{-1}$).

The width of the crystal is not critical and need only be enough to accommodate the light beam (i.e., at least about 1 mm). The crystal should not be too thin in the direction of light propagation as this will result in poor interaction between the light and sound and therefore a low intensity defraction, and if the crystal is too thick light loss due to absorption will be high. About 1 mm is the minimum length for a light-sound interaction to occur and at least about 1 cm is needed for a practical filter.

THE SOUND WAVES

The sound wave is a longitudinal wave (i.e., the particle motion is in the direction of propagation of the wave). Longitudinal waves are obtained by propagating the wave along the c-axis or another pure longitudinal direction using a longitudinal wave generating transducer such as X-cut quartz which is glued to the crystal. Another pure longitudinal direction exists close to the a-axis. Preferably, the sound wave is a standing wave rather than a moving wave as standing waves require less acoustic energy. A longitudinal wave interacts via the $p_{41}$ photoelectric coefficient to rotate light.

At 30 MHz, the velocity of shear waves propagating parallel to the c-axis is $1.03 \times 10^5$ cm/sec. For propagation along one of the a-axes, the velocity of longitudinal waves is $1.98 \times 10^5$ cm/sec. and of shear waves is $9.9 \times 10^4$ cm/sec.

The sound wave preferably has a power density of about 5 to about 1000 milliwatts/cm$^2$ since less than about 5 mw/cm$^2$ has little effect and more than about 1000 mw/cm$^2$ is unnecessary since all of the light will have been rotated at a lower power density, and may break the material.

I claim:

1. An acousto-optically tunable laser comprising:
    A. a lasing tube having a broad band radiation output lying on the optical path between a totally reflecting mirror and a partially reflecting mirror;
    B. analyzer means which passes only radiation having a predetermined plane of polarization, said analyzer means lying on the optical path between one of said mirrors and said lasing tube;
    C. an acousto-optical filter which rotates the plane of polarization of a frequency band of said radiation, said acousto-optical filter lying on the optical path between said analyzer means and said lasing tube; and
    D. means for polarizing the radiation of said lasing tube, and said means lying on the optical path between said acousto-optical filter and said lasing tube.

2. An acousto-optically tunable laser according to claim 1 wherein said acousto-optical filter comprises:
    A. a first crystal section having two optical faces at 90° to each other and a surface at 45° to each optical face;
    B. a reflecting coating on said surface;
    C. a second crystal section having a first surface fixed to said reflecting coating and a second surface at 45° to said first surface; and
    D. A transducer affixed to said second surface for generating an acoustic wave in said crystal sections.

3. An acousto-optically tunable, laser according to claim 2 wherein said crystal sections comprise Tl$_3$AsSe$_3$.

4. An acousto-optically tunable laser comprising:
    A. a lasing tube having a broad band radiation output lying on the optical path between a totally reflecting mirror and a partially reflecting mirror;
    B. an acousto-optical filter which rotates the plane of polarization of a frequency band of said radiation, said acousto-optical filter lying on the optical path between one of said mirrors and said lasing tube;
    C. rotator means for rotating the plane of polarization of said radiation, said rotator means lying on the optical path between said acousto-optical filter and said lasing tube; and
    D. polarizing means for polarizing the radiation of said lasing tube, said polarizing means lying on the optical path between said rotator means and said lasing tube.

5. An acousto-optically tunable laser according to claim 4 wherein said rotator means is a Faraday rotator.

6. An acousto-optically tunable laser according to claim 4 wherein said acousto-optical filter comprises:
    A. a crystal of Tl$_3$AsSe$_3$ having two parallel surfaces, said totally reflecting mirror being affixed to one of them; and
    B. a transducer fixed to said totally reflecting mirror for generating an acoustic wave in said crystal.

* * * * *